United States Patent [19]

Hillig et al.

[11] Patent Number: 4,640,899
[45] Date of Patent: Feb. 3, 1987

[54] MULLITE MATRIX COMPOSITE

[75] Inventors: William B. Hillig, Ballston Lake, N.Y.; Solomon Musikant, Paoli, Pa.

[73] Assignee: General Electric Company, Schenectady, N.Y.

[21] Appl. No.: 747,199

[22] Filed: Jun. 21, 1985

[51] Int. Cl.⁴ .................. C03C 10/04; C03C 14/00; C04B 35/18; C04B 35/58

[52] U.S. Cl. .......................... 501/5; 501/32; 501/87; 501/89; 501/95; 501/96; 501/97; 501/98; 501/128; 264/60; 264/125

[58] Field of Search ............ 501/5, 95, 89, 128, 501/32, 87, 96, 97, 98; 264/60, 125

[56] References Cited

U.S. PATENT DOCUMENTS

| | | | |
|---|---|---|---|
| 1,862,974 | 6/1932 | McDougal | 501/141 |
| 3,826,813 | 7/1974 | Gardner et al. | 501/128 |
| 3,857,923 | 12/1974 | Gardner et al. | 501/128 |
| 3,922,333 | 11/1975 | Mazdiyasni | 423/327 |
| 4,266,978 | 5/1981 | Prochazka | 264/125 |
| 4,272,500 | 6/1981 | Eggerding et al. | 501/5 |
| 4,384,046 | 5/1983 | Nakagami | 501/95 |
| 4,399,231 | 8/1983 | Prewo et al. | 501/89 |
| 4,421,861 | 12/1983 | Claussen et al. | 501/105 |
| 4,485,179 | 11/1984 | Brennan et al. | 501/32 |
| 4,526,876 | 7/1985 | Hodge | 501/128 |
| 4,528,275 | 7/1985 | Hodge | 501/128 |
| 4,539,300 | 9/1985 | Coblenz | 501/98 |

OTHER PUBLICATIONS

Ceramics Bulletin, vol. 63, Dec. 1984, p. 1476, (53–C-85C), "SiC Whiskers Reinforced Ceramic-Matrix Composites", Samanta et al.

Primary Examiner—Mark L. Bell
Attorney, Agent, or Firm—Jane M. Binkowski; James C. Davis, Jr.; Paul R. Webb, II

[57] ABSTRACT

A mixture of alumino-silicate glass, alumina and filler is hot pressed to produce a mullite composite.

60 Claims, 1 Drawing Figure

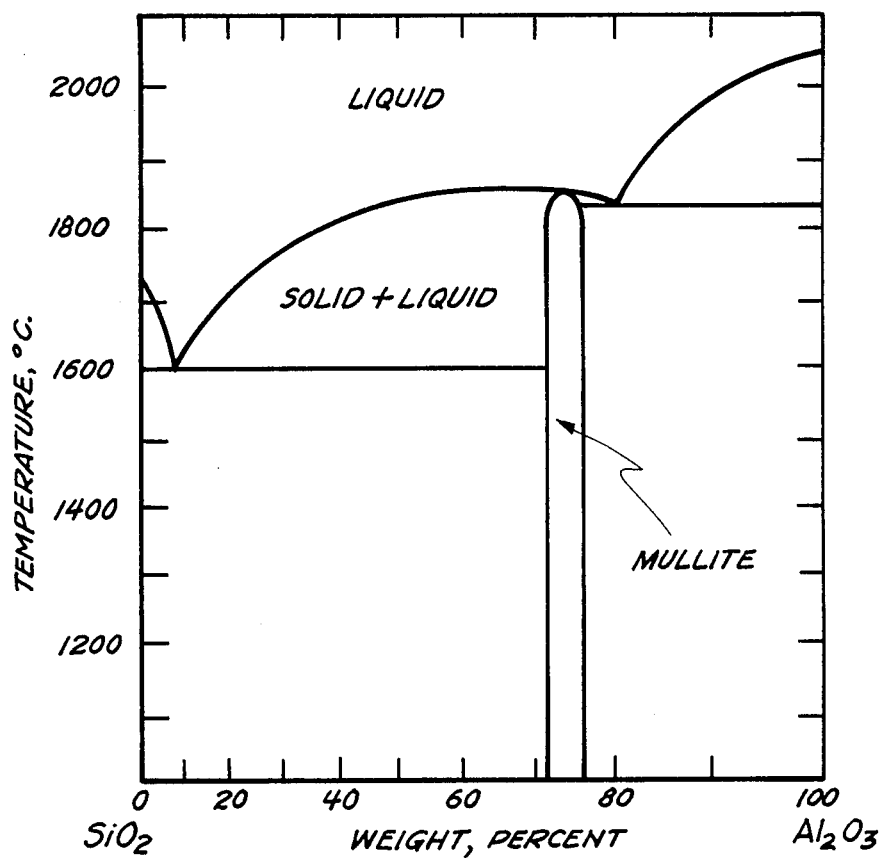

MULLITE MATRIX COMPOSITE

The present invention relates to reactive hot pressing and to a composite comprised of a continuous interconnecting phase of polycrystalline mullite and a polycrystalline inorganic filler phase.

In copending U.S. Ser. No. 747,536 entitled MULLITE BY REACTIVE HOT PRESSING filed on even date herewith in the names of W. B. Hillig and S. Musikant and assigned to the assignee hereof and incorporated herein by reference, there is disclosed the hot pressing of a mixture of alumino-silicate glass and alumina having a composition corresponding to mullite and containing a nucleating mullite powder to produce a dense polycrystalline mullite body having an average grain size of less than 15 microns.

Polycrystalline mullite, a polycrystalline aluminum silicate phase of composition $3Al_2O_3 \cdot 2SiO_2$ or close to $3Al_2O_3 \cdot 2SiO_2$ can contain from about 71.5 weight % to about 76 weight % $Al_2O_3$ and it has a melting point generally above 1820° C. depending on its specific composition.

Mullite is an attractive high temperature structural ceramic material because of its high melting temperature, its relatively low thermal expansivity and thermal conductivity compared with alumina. However, pure mullite ceramics are relatively difficult materials to produce. Conventionally made material does not have outstanding strength.

Fracture toughness is also a major consideration. One effective way to enhance such toughness is by incorporating fibrous high strength reinforcement materials into the structure. It should be possible to toughen mullite in this way by making it the continuous matrix phase in which the fibers are embedded. Candidate fiber materials include SiC and $Si_3N_4$ whiskers or filaments. However, the presence of stiff filaments in the green (unconsolidated) structure interferes with normal sintering. Such fibers act like rods which oppose shrinkage during sintering which is needed to produce a fully dense final structure.

The present invention provides a means of avoiding the anti-shrinkage characteristics of fibers.

The present invention utilizes reactive hot pressing, a technique which involves hot pressing a mixture of materials which will undergo some type of chemical reaction or transformation during the heat treatment. The resulting material will then have the same overall chemical composition as the starting material, but its phase content will be different.

More specifically, in one aspect, this invention is directed to a process for forming a composite of controlled geometry useable up to the melting point of polycrystalline mullite. The starting mixture is comprised of amorphous alumino-silicate glass powder, alumina powder and filler. The filler should be stable at the processing temperature, and not reactive, or not significantly reactive, with the mullite phase that is formed in situ.

The mixture is then hot pressed. As the temperature is raised, the glass starts to soften and at some temperature it becomes sufficiently fluid so that its yield stress will be overcome by the pressure applied to the die, forcing the fluid glass to fill interstices and surround the particles and/or filaments of filler forming a continuous interconnecting phase. The alumina dissolves in the glass reacting with it to form mullite in situ.

A typical example of the present invention is shown in the following reaction:

$$SiC + \text{alumino-silicate glass} + Al_2O_3 = SiC + \text{mullite}$$

SiC in the above example is the present filler and does not participate to any significant extent in the reaction. It remains as an inert phase while the reaction between the glass and alumina takes place.

One of the advantages of the present method is that it will yield a composite with a continuous mullite phase which encapsulates at least about 20% by volume of the filler and/or filaments and which either encapsulates or is intermixed with the balance of the filler particles and/or filaments.

Those skilled in the art will gain a further and better understanding of the present invention from the detailed description set forth below, considered in conjunction with the accompanying figure forming a part of the specification which is a phase diagram for the $SiO_2$—$Al_2O_3$ system showing the present mullite phase.

Briefly stated, the present process for producing a composite comprised of polycrystalline mullite phase ranging from about 20% by volume to about 99.9% by volume of the composite and a polycrystalline inorganic filler ranging from about 0.1% by volume to about 80% by volume of the composite comprises forming a mixture of amorphous alumino-silicate glass, alumina and filler in amounts required to produce said composite, said glass being comprised of from about 15% by weight to about 40% by weight $Al_2O_3$ balance $SiO_2$ and having a liquidus temperature below about 1800° C., and hot pressing the mixture at a temperature at which said glass is fluid but below its liquidus temperature under a pressure at least sufficient to force the fluid glass to encapsulate at least about 20% by volume of said filler and encapsulate and intermix with the balance of said filler forming a continuous interconnecting phase, said alumina dissolving in and reacting with said glass producing said composite.

In a preferred embodiment, the present process produces a composite comprised of polycrystalline mullite having an average grain size of less than about 15 microns in an amount ranging from about 20% by volume to about 99.9% by volume of the composite and a polycrystalline inorganic filler ranging from about 0.1% by volume to about 80% by volume of the composite comprises forming a mixture of amorphous alumino-silicate glass, alumina, polycrystalline mullite nucleating agent and filler, said glass being comprised of from about 15% by weight to about 40% by weight $Al_2O_3$ balance $SiO_2$ and having a liquidus temperature below about 1800° C., said glass, alumina and filler being present in amounts required to produce said composite, said nucleating agent having an average particle size of less than about 5 microns and ranging from about 0.1% by weight to about 10% by weight of the total weight of said glass and alumina, and hot pressing the mixture at a temperature at which said glass is fluid but below its liquidus temperature under a pressure at least sufficient to force the fluid glass to encapsulate at least about 20% by volume of said filler and encapsulate and intermix with the balance of said filler forming a continuous interconnecting phase, said alumina dissolving in and reacting with said glass producing said composite.

The present alumino-silicate glass can be formed by a number of techniques and can be produced by conventional glass making techniques from a mixture of $Al_2O_3$ and $SiO_2$. The present alumino-silicate glass is an amorphous material comprised of from about 15% by weight to about 40% by weight $Al_2O_3$ balance $SiO_2$. Preferably, it contains as much $Al_2O_3$ as practical since with increasing $Al_2O_3$ content, the fluidity of the glass increases. Frequently, however, the glass contains from about 20% by weight to about 30% by weight $Al_2O_3$ since glass with a higher content of $Al_2O_3$ requires significantly higher temperatures for its preparation and the required high temperature equipment may not be conventionally available.

The present alumino-silicate glass has a liquidus temperature below 1800° C. and which generally ranges from above about 1600° C. to less than about 1800° C. depending on its particular $Al_2O_3$ content, i.e. the higher the $Al_2O_3$ content the higher is its liquidus temperature. By the liquidus temperature of the glass herein it is meant that temperature at which no crystalline material can exist stably. Also, the higher the $Al_2O_3$ content of the glass, the more fluid it is at a given temperature. For example, at 1300° C. the glass having a 40% by weight $Al_2O_3$ and 60% by weight $SiO_2$ is fluid and has a viscosity of about 20,000 poise, whereas the glass containing 15% by weight $Al_2O_3$ is practically not fluid being about 50,000 times more viscous. By a fluid glass herein it is meant a plastic deformable glass.

The present glass and alumina powders are used in amounts required to produce the mullite phase. The average particle size of the glass and alumina powders can vary, and generally, it is less than about 10 microns, and preferably, it is submicron. Preferably, to insure production of a uniform or substantially uniform distribution of filler in the composite, the average particle size of the glass and alumina powders should not be larger than the smallest dimension of the filler.

In the preferred embodiment of the present process, a nucleating agent comprised of polycrystalline mullite powder is used to produce a composite having a polycrystalline mullite phase of uniform or substantially uniform grain size with an average grain size of less than about 15 microns. The present nucleating agent constitutes the microcrystalline growth centers from which further growth into the final mullite grains occurs. The nucleating mullite powder preferably is of uniform or substantially uniform particle size. Its average particle size depends largely on the average grain size desired in the mullite phase and is determinable empirically, and generally, it is less than about 5 microns. Ordinarily, the finer the size of the nucleating agent, the finer will be the grain size of the resulting mullite. Preferably, the average particle size of the nucleating mullite powder is about 20% of the desired average grain size of the resulting mullite phase. In the present invention, the nucleating powder preferably has an average particle size which is less than about 2.5 microns, more preferably less than about 1 micron, and most preferably it ranges between about 0.1 micron to about 0.5 micron. In a preferred embodiment, a nucleating powder having an average particle size ranging between about 0.1 micron to about 0.5 micron is used to produce the present composite wherein the mullite phase has an average grain size of about 1 micron.

The particular amount of nucleating mullite powder used is determinable empirically and depends largely on the amount of alumino-silicate glass and alumina present. The nucleating powder must be present in at least an amount which provides sufficient growth centers to produce the mullite grain size desired. Generally, in the present process, the nucleating powder is used in an amount ranging from about 0.5% by weight to about 10% by weight, preferably from about 1% by weight to about 5% by weight of the total weight of the alumino-silicate glass and alumina. An amount of nucleating powder less than about 0.5% by weight may not be enough to be operable whereas an amount in excess of about 10% by weight may have a detrimental effect on the viscosity of the glass. Generally, the finer the size of the nucleating powder, the less of it is needed to produce the present preferred composite.

The present filler is any inorganic material which is a solid at the processing temperature and which does not react or does not react to any significant extent with mullite, alumina, or the alumino-silicate glass. More specifically, the filler used in the present process as the inert phase in the composite has the characteristic of being stable at the temperatures necessary for processing or it is not significantly affected by the processing temperatures. Also, in the present process, the filler is relatively inert so that the favored reaction will be between the reactants to form mullite. The present process has no significant effect on the filler.

The particular filler or mixture of fillers used in the present process depends largely on the particular composite desired, i.e., the particular properties desired in the composite.

Generally, the filler is a ceramic material. Representative of ceramic carbides useful in the present process are the carbides of boron, hafnium, niobium, silicon, tantalum, titanium, vanadium, zirconium, and mixtures and solid solutions thereof.

Still other useful fillers are the ceramic borides such as the borides of hafnium, niobium, tantalum, titanium, vanadium, zirconium, and mixtures and solid solutions thereof. More specifically, representative of the borides are $HfB_2$, $NbB$, $NbB_2$, $TaB$, $TaB_2$, $TiB_2$, $VB$, $VB_2$ and $ZrB_2$. Still other useful fillers are the ceramic nitrides, such as silicon nitride, silicides such as molybdenum disilicide and other similar ceramic refractory materials.

The filler can be in any desired form such as, for example, a powder or filament or mixtures thereof. Generally, when the filler is in the form of a powder, it is characterized by a mean particle size and this mean particle size generally can range from about 0.1 micron to about 1000 microns, and preferably, it ranges from about 0.2 micron to about 100 microns, and more preferably it ranges from about 0.5 micron to about 25 microns.

In one embodiment of the present invention, to produce a composite of high density, or of a particular microstructure, a particle size distribution of the filler powder can be used with fractions of coarse or coarser particles being admixed with fractions of fine or finer particles so that the fine particles fit into the void between the large silicon carbide particles and improve packing. The optimum distribution is determinable empirically.

As used herein, filament includes a whisker or fiber of filler. Generally, the present filler filament has an aspect ratio of at least 5, and in one embodiment of the present invention it is higher than 50, and yet in another embodiment of the present invention it is higher than 1000. Generally, the lower the aspect ratio of the filament, the higher is the packing which can be achieved in the resulting composite since the small filaments intertwine or interlock. Also, generally, the higher the aspect ratio of the filaments, the better are the mechanical properties of the resulting composite. Generally, the present filament can range in diameter from about 0.1 micron to about 20 microns, and can range in length from about 3 microns to about 10 centimeters.

In one embodiment of the present process, a mixture of filler powder and filaments is used to produce a composite of desired density, mechanical strength or microstructure. The particular desired mixture of powder and filaments is determinable empirically.

A mixture of filler powders of distributed size or a mixture of filler powder and filaments can be produced by a number of techniques. For example, fractions of filler powders of distributed size or filler powder and filaments can be admixed in water at ambient pressure and temperature using, for example, a propeller blender, and the resulting dispersion can be dried in air at ambient temperature.

In carrying out the present process, a uniform or at least a substantially uniform mixture is formed of the components, i.e. filler, alumina powder, alumino-silicate glass powder and, when it is used, nucleating agent. The glass and alumina are used in the amounts required to react to form the continuous phase of mullite ranging from about 20% by volume to about 99.9% by volume of the total volume of the composite.

The amount of the filler used also depends on the particular composite desired. In the present process, it is used in an amount which produces a composite wherein the phase of filler ranges from about 0.1% by volume to about 80% by volume of the total volume of the composite.

The components can be admixed by a number of conventional techniques such as, for example, ball milling, vibratory milling or jet milling, to produce a uniform or substantially uniform mixture. The more uniform the mixture, the more uniform is the microstructure, and therefore, the properties of the resulting composite.

Representative of these mixing techniques is ball milling. Milling may be carried out dry or with the charge suspended in a liquid medium inert to the ingredients. Typical liquids include ethyl alcohol and acetone. Wet milled material can be dried by a number of conventional techniques to remove the liquid medium.

Hot pressing of the mixture is preferably carried out in a non-oxidizing atmosphere. More particularly, hot pressing of the mixture is carried out in a protective atmosphere in which the mixture is inert or substantially inert, i.e. an atmosphere which has no significant deleterious effect on it. Representative of the hot pressing atmospheres is nitrogen, argon, helium or a vacuum.

In one embodiment of the present process, the mixture can be pressed in a conventional manner, generally by die pressing at room temperature, to produce a desired compressed form or preform before it is placed in the hot press.

In carrying out the present process, the mixture is hot pressed under a pressure and temperature and for a sufficient period of time to produce the present composite. Maximum hot pressing temperature generally ranges from about 1500° C. to about 1750° C., and preferably from about 1550° C. to 1700° C., depending upon the particular aluminosilicate glass used and is determinable empirically. Temperatures lower than about 1500° C. generally are not high enough to sufficiently soften the glass to produce the present composite. On the other hand, temperatures above 1750° C. are too close to the maximum liquidus temperature of the glass. At or close to the liquidus temperature, the alumina is likely to dissolve too quickly in the glass and react with it too rapidly forming a substantial amount of polycrystalline mullite prematurely thereby preventing production of the present continuous interconnecting phase of polycrystalline mullite. Specifically, the hot pressing temperature must be one which allows the glass to form a continuous interconnecting phase around the filler before it is substantially or totally reacted to produce the polycrystalline mullite phase.

The heating rate to the present maximum hot pressing temperature is determinable empirically. It should be sufficiently rapid to prevent dissolution of the alumina in the glass to any significant degree, and thereby prevent any significant formation of crystalline mullite below the maximum hot pressing temperature. Such heating rate may be as low as about 30° C. per minute, but preferably, it is at least about 50° C. per minute, and most preferably it is about 200° C. per minute. The maximum heating rate in the present process is limited only by the equipment. The formation of polycrystalline mullite in a significant amount below hot pressing temperature prevents production of the present continuous phase of which encapsulates at least about 20% by volume of the filler.

The hot pressing pressure can vary and should be at least sufficient to confine the material in the hot press and make the mullite reaction take place during the present reactive hot pressing. Hot pressing pressure can range to a maximum pressure which is limited by the available pressing equipment. Typically, hot pressing pressure ranges from about 2000 psi to about 8000 psi.

In the present process, there is no significant loss of the reactants or components forming the present composite.

The present composite can contain a glassy phase in an amount of less than about 20% by volume, preferably less than about 10% by volume, more preferably less than about 5% by volume, and still more preferably less than about 1% by volume, of the total volume of said composite. Even more preferably, the present composite contains only a detectable amount of glassy phase. Therefore, glassy phase in the present composite can range from a detectable amount up to about 20% by volume of the total volume of the composite. The amount of glassy phase present in the composite depends largely on the insufficient crystallization of the mullite phase formed in situ. Conversion of the glassy phase of mullite composition to polycrystalline mullite can be done by subsequently heating the composite in a vacuum or at or about atmospheric pressure in an atmosphere in which it is inert or substantially inert, i.e. an atmosphere which has no significant deleterious effect on it, at a temperature ranging from about 1200° C. to about 1500° C. for a time period determinable empirically. Generally, the atmosphere is a non-oxidizing atmosphere. Representative of these atmospheres is nitrogen, argon and helium.

The present polycrystalline composite is comprised of a continuous interconnecting phase of polycrystalline mullite, a phase of filler, and possibly a glassy phase. The polycrystalline mullite is phase pure. The phases are distributed uniformly, substantially uniformly or at least significantly uniformly in the composite.

Briefly stated, the present composite is comprised of polycrystalline mullite ranging from about 20% by volume to about 99.9% by volume of the composite and a polycrystalline inorganic filler ranging from about 0.1% by volume to about 80% by volume of the composite, said composite having a porosity of less than about 10% by volume of the composite. In another embodiment, the present composite also contains a glassy phase ranging from a detectable amount up to about 10% by volume of said composite.

In yet another embodiment, the present composite is comprised of polycrystalline mullite ranging from about 40% by volume to about 60% by volume of the composite and filler ranging from about 20% by volume to about 60% by volume of the composite.

The present composite has a porosity of less than about 10% by volume, preferably less than about 5% by volume, more preferably less than about 2% by volume, still more preferably less than about 1% by volume, and most preferably it is fully dense, i.e. it has no significant or detectable porosity.

When mullite powder is used as a nucleating agent, the polycrystalline mullite phase present in the composite has a uniform or substantially uniform grain size and it has an average grain size which depends largely on the particle size of the nucleating agent. More specifically, in such instance, the polycrystalline mullite phase in the composite can have an average grain size of less than about 15 microns, preferably less than about 10 microns, more preferably, less than about 5 microns, still more preferably less than about 2 microns, and most preferably, it is about 1 micron or less.

In one embodiment of the present composite, the phase of filler is comprised of filler particles having an average particle size of less than about 15 microns, preferably less than about 10 microns, more preferably less than about 5 microns, still more preferably less than about 2 microns, and most preferably it is about 1 micron or less. By filler particle herein it is meant individual filler grains and/or clusters of the grains.

In another embodiment of the present composite, the phase of filler is comprised of filaments or a cluster of filaments having an aspect ratio of at least 5 and a diameter ranging from about 0.1 micron to about 20 microns.

In the present composite the continuous mullite phase encapsulates and is intermixed with the filler phase. More specifically, the mullite phase encapsulates at least about 20% by volume, preferably at least about 50% by volume, and most preferably more than 90% by volume of the filler particles or filaments. By such encapsulation, it is meant that the mullite phase encapsulates the individual grain and/or cluster of grains and/or the individual filament or cluster of filaments.

The present composite has a number of uses. For example, it is useful as a high temperature structural material, as a gasket, and as a wear resistant part such as a bushing.

The invention is further illustrated by the following examples where the procedure was as follows unless other wise noted:

The alumina powder had an average particle size of 0.3 micron.

The alumino-silicate amorphous glass powder had an average particle size of about 2 microns and was comprised of 20 weight % $Al_2O_3$ and 80 weight % $SiO_2$.

The nucleating agent was composed of polycrystalline mullite powder of submicron average particle size.

The SiC powder ranged in particle size from about 2 to 5 microns.

The SiC whiskers ranged from 0.5 to 2 microns in diameter and had an aspect ratio greater than 100:1.

Hot pressing was carried out in an induction-heated graphite die in a nitrogen atmosphere. At the completion of hot pressing, the hot pressed body was furnace cooled to ambient temperature.

Heating rate to the maximum hot pressing temperature was about 200° C. per minute.

EXAMPLE 1

A base mixture having the gross composition corresponding to $3Al_2O_3.2SiO_2$ was made up comprising 10.00 grams of the alumino-silicate glass, 20.37 grams of the alumina and 3.07 grams of the nucleating mullite powder. Specifically the mixture was prepared by wet mixing the components in a ball mill at room temperature and then drying the slurry in air producing a substantially uniform mixture.

A 10 gram portion of the base mixture was admixed with 10 grams of the SiC powder and dry sieved through a 325 mesh screen, producing a substantially uniform mixture. A four gram portion of the resulting SiC-containing mixture was die pressed into a pellet at room temperature. The pellet then was hot pressed under an applied pressure of 2500 psi. At 1300° C. the greatest degree of compaction of the pellet was observed. The temperature was taken up to 1600° C. where it was held for about 5 minutes and then furnace cooled to ambient temperature. The total time of heating was about 15 minutes. The resulting hot pressed body came out chalky and had a 30% porosity indicating that a temperture of 1600° C. was too low to make this particular glass sufficiently fluid to produce the present composite.

EXAMPLE 2

A 3.5 gram portion of the SiC-containing mixture prepared in Example 1 was die pressed into a pellet at room temperature. The pellet was then hot pressed under an applied pressure of 6200 psi. The maximum hot pressing temperature was 1710°±10° C. where it was held for about 8 minutes and then furnace cooled to room temperature. The total time of heating was about 20 minutes.

The resulting hot pressed body, i.e. the present composite, was polished and examined microscopically. It was a fully dense material (3.11 g/cm$^3$) with a porosity of 0.0%. Specifically, the composite was comprised of about 50% by volume SiC and about 50% by volume mullite. It appeared that the mullite phase encapsulated substantially all of the SiC particles.

The composite was immersed in boiling aqueous 10 w/o NaOH solution for about 20 minutes, rinsed off with water and dried. Microscopic re-examination of the composite showed no evidence for any pitting or other localized material removal, that is no pockets of glass phase were detectable. However, there was some localized etching revealing uniform grains of about 2 microns in diameter.

This composite would be useful as a high temperature bushing.

The composite was heated in air at atmospheric pressure at 1400° C. for 48 hours. This heat treatment resulted in oxidation of the SiC grains that were exposed to the atmosphere. The composite was then repolished substantially removing the oxidized material.

The polished heat treated sample was immersed in boiling aqueous 10 w/o NaOH solution for about 20 minutes, rinsed with water and dried. Microscopic examination showed that it looked the same as before the heat treatment.

It was then swabbed with aqueous 10 w/o HF solution for 2 minutes, rinsed off with water and dried. Microscopic examination revealed no change in appearance, providing further support for the absence of any residual pockets of untransformed glass. The composite was then immersed in boiling aqueous 50 w/o NaOH solution for 5 minutes, rinsed off with water and dried. Microscopic re-examination of the composite revealed that the mullite phase was comprised of very uniform grains of the order of about 2 microns in diameter. Also, the etching did not reveal any detectable glass content as would be noted by pitting. X-ray diffraction analysis of the composite showed strong mullite and SiC lines and also indicated the presence of some amorphous material which is believed to have been formed by the oxidation of the SiC caused by the lengthy heating of the composite in air. This composite also would be useful as a high temperature bushing.

EXAMPLE 3

The procedure used in this example was substantially the same as disclosed in Example 1 except that a 3.5 gram portion of the SiC-containing mixture was used and admixed with 0.17 gram of SiC whiskers and the mixture was die pressed into a pellet. Also, the applied pressure was 6200 psi, and the maximum hot pressing temperature was 1700±20° C. where it was held for 20 minutes. The total time of heating was 30 minutes.

The resulting hot pressed body, i.e. the present composite, was polished and examined microscopically. It was a fully dense material (3.11 g/cm$^3$) with a porosity of 0.0%. Specifically, the composite was comprised of about 55% by volume SiC and about 45% by volume mullite. It appeared that the mullite phase encapsulated substantially all of the SiC particles and whiskers This composite would be useful for high temperature seal.

EXAMPLE 4

This example illustrates the production of a mullite body without filler.

A four gram portion of the base mixture prepared in Example 1 mixture was die pressed into a pellet at room temperature. The pellet then was hot pressed under an applied pressure of 2500 psi. Hot pressing was carried out in an induction-heated graphite die in a nitrogen atmosphere. At 1300° C. the greatest degree of compaction of the pellet was observed. The temperature was taken up to 1700° C. where it was held for about 5 minutes and then furnace cooled to ambient temperature. The total time of heating was about 12 minutes.

The resulting hot pressed body was polished. Microscopic examination of the polished surface showed negligible porosity, i.e. less than about 1% by volume of the body. There was some sub-surface haziness evident which could not be resolved under a microscope at 1000×.

X-ray diffraction analysis of the body showed very strong mullite lines.

The hot pressed body was immersed in boiling aqueous 10 w/o NaOH solution for about 20 minutes, rinsed off with water and dried. Microscopic re-examination of the body showed no evidence for any pitting or other localized material removal, that is no pockets of glass phase were detectable. However, there was some localized etching revealing uniform grains of about 1 micron in diameter.

The hot pressed body was heated in air at atmospheric pressure at 1400° C. for 48 hours and then repolished. The gross appearance changed from a blackish translucent body to a white opaque body as a result of the heat treatment. The polished heat treated sample was immersed in boiling aqueous 10 w/o NaOH solution for about 20 minutes, rinsed with water and dried. Miscoscopic examination showed that it looked the same as before the heat treatment.

It was then swabbed with aqueous 10 w/o HF solution for 2 minutes, rinsed off with water and dried. Microscopic examination revealed no change in appearance, providing further support for the absence of any residual pockets of untransformed glass. The body was then immersed in boiling aqueous 50 w/o NaOH solution for 5 minutes, rinsed off with water and dried. Microscopic re-examination of the body revealed over its surface very uniform grains of the order of about 1 micron in diameter. Also, the etching did not reveal any detectable glass content as would be noted by pitting. X-ray diffraction analysis again showed very strong mullite lines, with some indication of minor amount of amorphous material.

What is claimed is:

1. A composite consisting essentially of a continuous interconnecting polycrystalline mullite phase ranging from about 40% by volume to about 80% by volume of said composite and a polycrystalline inorganic non-oxide filler phase ranging from about 20% by volume to about 60% by volume of the composite, said mullite phase encapsulating at least about 50% by volume of said filler phase and encapsulating and being intermixed with the balance of said filler phase, said filler phase being distributed at least significantly uniformly in said composite, said composite having a porosity of less than about 5% by volume of said composite.

2. The composite according to claim 1 wherein said filler is particulate in form.

3. The composite according to claim 1 wherein said filler is in the form of filaments.

4. The composite according to claim 1 wherein said filler is comprised of a mixture of particles and filaments.

5. The composite according to claim 1 wherein said mullite has an average grain size less than about 15 microns.

6. The composite according to claim 1 wherein said composite contains a glassy phase ranging from a detectable amount up to about 10% by volume of said composite.

7. The composite according to claim 1 wherein said porosity is less than about 1% by volume.

8. A process for producing a composite comprised of polycrystalline mullite phase ranging from about 20% by volume to about 99.9% by volume of said composite and a polycrystalline inorganic filler ranging from about 0.1% by volume to about 80% by volume of the composite, said composite having a porosity of less than about 10% by volume, which consists essentially of forming a mixture of amorphous alumino-silicate glass powder, alumina powder and filler in amounts required to produce said composite, said glass powder consisting essentially of from about 15% by weight to about 40% by weight $Al_2O_3$ balance $SiO_2$ and having a liquidus temperature below about 1800° C., said glass powder, alumina powder and filler being present in amounts required to produce said composite, said filler being a solid in said process and not significantly affected by said process, and hot pressing the mixture at a temperature ranging from about 1500° C. to about 1750° C. at which said glass is fluid but below its liquidus temperature under a pressure at least sufficient to force the fluid glass to encapsulate at least about 50% by volume of said filler and encapsulate and intermix with the balance of said filler forming a continuous interconnecting phase, said hot pressing of said mixture being carried out in a non-oxidizing atmosphere, said alumina dissolving in and reacting with said glass producing said composite.

9. The process according to claim 8 wherein said filler is in the form of a powder.

10. The process according to claim 8 wherein said filler is in the form of filaments.

11. The process according to claim 8 wherein said filler is comprised of a mixture of powder and filaments.

12. The process according to claim 8 wherein said composite contains a glassy phase from a detectable amount up to about 20% by volume of said composite.

13. The process according to claim 8 wherein said composite contains a glassy phase ranging from a detectable amount up to about 20% by volume of said composite and wherein said composite is heated at a temperature ranging from about 1200° C. to about 1500° C. to convert said glassy phase to polycrystalline mullite.

14. A process for producing a composite comprised of polycrystalline mullite phase having an average grain size of less than about 15 microns ranging from about 20% by volume to about 99.9% by volume of said composite and a polycrystalline inorganic filler phase ranging from about 0.1% by volume to about 80% by volume of said composite, said composite having a porosity of less than about 10% by volume, which consists essentially of forming a mixture of amorphous alumino-silicate glass powder, alumina powder, polycrystalline mullite nucleating agent powder and filler, said glass powder consisting essentially of from about 15% by weight to about 40% by weight $Al_2O_3$ balance $SiO_2$ and having a liquidus temperature below about 1800° C., said glass powder, alumina powder, nucleating agent and filler being present in amounts required to produce said composite, said nucleating agent having an average particle size of less than about 5 microns and ranging from about 0.1% by weight to about 10% by weight of the total weight of said glass and alumina, said filler being a solid in said process and not significantly affected by said process, and hot pressing the mixture at a temperature ranging from about 1500° C. to about 1750° C. at which said glass is fluid but below its liquidus temperature under a pressure at least sufficient to force the fluid glass to encapsulate at least about 50% by volume of said filler and encapsulate and intermix with the balance of said filler forming a continuous interconnecting phase, said hot pressing of said mixture being carried out in a non-oxidizing atmosphere, said alumina dissolving in and reacting with said glass producing said composite.

15. The process according to claim 14 wherein said filler is in the form of a powder.

16. The process according to claim 14 wherein said filler is in the form of filaments.

17. The process according to claim 14 wherein said filler is comprised of a mixture of powder and filaments.

18. The process according to claim 14 wherein said nucleating agent is used in an amount of less than 1% by weight and has a particle size ranging between about 0.1 micron to about 0.5 micron and said polycrystalline mullite phase has an average grain size of about 1 micron.

19. The process according to claim 14 wherein said composite contains a glassy phase ranging from a detectable amount up to about 20% by volume of said composite and wherein said composite is heated at a temperature ranging from about 1200° C. to about 1500° C. to convert said glassy phase to mullite.

20. The composite according to claim 1 wherein said filler is a carbide of a member selected from the group consisting of boron, hafnium, niobium, silicon, tantalum, titanium, vanadium, zirconium and a mixture and solid solution thereof.

21. The composite according to claim 1 wherein said filler is a boride selected from the group consisting of $HfB_2$, NB, $NbB_2$, TaB, $TaB_2$, $TiB_2$, VB, $VB_2$, $ZrB_2$ and a mixture and solid solution thereof.

22. The composite according to claim 1 wherein said filler is a ceramic nitride.

23. The composite according to claim 1 wherein the filler is a ceramic silicide.

24. The composite according to claim 1 wherein said filler is silicon nitride.

25. The composite according to claim 1 wherein said mullite phase encapsulates more than 90% by volume of said filler phase.

26. The process according to claim 14 wherein said filler is a carbide of a member selected from the group consisting of boron, hafnium, niobium, silicon, tantalum, titanium, vanadium, zirconium and a mixture and solid solution thereof.

27. The process according to claim 14 wherein said filler is a boride selected from the group consisting of $HfB_2$, NbB, $NbB_2$, TaB, $TaB_2$, $TiB_2$, VB, $VB_2$, $ZrB_2$, and a mixture and solid solution thereof.

28. The process according to claim 14 wherein said filler is a ceramic nitride.

29. The process according to claim 14 wherein said filler is a ceramic silicide.

30. A composite consisting essentially of a continuous interconnecting mullite phase ranging from about 20% by volume to about 99.9% by volume of said composite and a polycrystalline inorganic filler phase ranging from about 0.1% by volume to about 80% by volume of the composite, said filler phase being a carbide of a member selected from the group consisting of boron, hafnium, niobium, silicon, tantalum, titanium, vanadium, zirconium, and a mixture and solid solution thereof, said mullite phase encapsulating at least about 50% by volume of said filler phase and encapsulating and being intermixed with the balance of said filler phase, said filler phase being distributed at least significantly uniformly in said composite, said composite having a porosity of less than about 5% by volume of said composite.

31. The composite according to claim 30 wherein said filler is particulate in form.

32. The composite according to claim 30 wherein said filler is in the form of a filaments.

33. The composite according to claim 30 wherein said filler is comprised of a mixture of particles and filaments.

34. The composite according to claim 30 wherein said mullite has an average grain size less than about 15 microns.

35. The composite according to claim 30 wherein said composite contains a glassy phase ranging from a detectable amount up to about 10% by volume of said composite.

36. A composite consisting essentially of a continuous interconnecting polycrystalline mullite phase ranging from about 20% by volume to about 99.9% by volume of said composite and a polycrystalline inorganic filler phase ranging from about 0.1% by volume to about 80% by volume of the composite, said filler being a member selected from the group consisting of $HfB_2$, $NbB$, $NbB_2$, $TaB$, $TaB_2$, $TiB_2$, $VB$, $VB_2$, $ZrB_2$, and a mixture and solid solution thereof, said mullite phase encapsulating at least about 50% by volume of said filler phase and encapsulating and being intermixed with the balance of said filler phase, said filler phase being distributed at least significantly uniformly in said composite, said composite having a porosity of less than about 5% by volume of said composite.

37. The composite according to claim 36 wherein said filler is particulate in form.

38. The composite according to claim 36 wherein said filler is in the form of filaments.

39. The composite according to claim 36 wherein said filler is comprised of a mixture of particles and filaments.

40. The composite according to claim 36 wherein said mullite has an average grain size less than about 15 microns.

41. The composite according to claim 36 wherein said composite contains a glassy phase ranging from a detectable amount up to about 10% by volume of said composite.

42. A composite consisting essentially of a continuous interconnecting polycrystalline mullite phase ranging from about 20% by volume to about 99.9% by volume of said composite and polycrystalline silicon nitride filler phase ranging from about 0.1% by volume to about 80% by volume of the composite, said mullite phase encapsulating at least about 50% by volume of said filler phase and encapsulating and being intermixed with the balance of said silicon nitride filler phase, said filler phase being distributed at least significantly uniformly in said composite, said composite having a porosity of less than about 5% by volume of said composite.

43. The composite according to claim 42 wherein said filler is particulate in form.

44. The composite according to claim 42 wherein said filler is in the form of filaments.

45. The composite according to claim 42 wherein said filler is comprised of a mixture of particles and filaments.

46. The composite according to claim 42 wherein said mullite has an average grain size less than about 15 microns.

47. The composite according to claim 42 wherein said composite contains a glassy phase ranging from a detectable amount up to about 10% by volume of said composite.

48. A composite consisting essentially of a continuous interconnecting polycrystalline mullite phase ranging from about 20% by volume to about 99.9% by volume of said composite and polycrystalline molybdenum disilicide filler phase ranging from about 0.1% by volume to about 80% by volume of the composite, said mullite phase encapsulating at least about 50% by volume of said filler phase and encapsulating and being intermixed with the balance of said filler phase, said filler phase being distributed at least significantly uniformly in said composite, said composite having a porosity of less than about 5% by volume of said composite.

49. The composite according to claim 48 wherein said filler is particulate in form.

50. The composite according to claim 48 wherein said filler is in the form of filaments.

51. The composite according to claim 48 wherein said filler is comprised of a mixture of particles and filaments.

52. The composite according to claim 48 wherein said mullite has an average grain size less than about 15 microns.

53. The composite according to claim 48 wherein said composite contains a glassy phase ranging from a detectable amount up to about 10% by volume of said composite.

54. A composite consisting essentially of a continuous interconnecting polycrystalline mullite phase ranging from about 20% by volume to about 99.9% by volume of said composite and a polycrystalline inorganic filler phase ranging from about 0.1% by volume to about 80% by volume of the composite, said mullite phase encapsulating at least about 50% by volume of said filler phase and encapsulating and being intermixed with the balance of said filler phase, said filler phase being in the form of filaments and being distributed at least significantly uniformly in said composite, said composite having a porosity of less than about 5% by volume of said composite.

55. A composite consisting essentially of a continuous interconnecting polycrystalline mullite phase ranging from about 40% by volume to about 80% by volume of said composite and a polycrystalline inorganic filler phase ranging from about 20% by volume to about 60% by volume of the composite, said mullite phase encapsulating at least about 50% by volume of said filler phase and encapsulating and being intermixed with the balance of said filler phase, said filler phase being in the form of filaments and being distributed at least significantly uniformly in said composite, said composite having a porosity of less than about 5% by volume of said composite.

56. The composite according to claim 55 wherein said filler is a carbide of a member selected from the group consisting of boron, hafnium, niobium, silicon, tantalum, titanium, vanadium, zirconium and a mixture and solid solution thereof.

57. The composite according to claim 55 wherein said filler is a boride selected from the group consisting of $HfB_2$, $NB$, $NbB_2$, $TaB$, $TaB_2$, $TiB_2$, $VB$, $VB_2$, $ZrB_2$ and a mixture and solid solution thereof.

58. The composite according to claim 55 wherein said filler is a ceramic nitride.

59. The composite according to claim 55 wherein said filler is ceramic silicide.

60. The composite according to claim 55 wherein said composite contains a glassy phase ranging from a detectable amount up to about 10% by volume of said composite.

* * * * *